Oct. 2, 1945. C. E. SWENSON 2,386,013
ONE-WAY CLUTCH
Filed June 16, 1943 2 Sheets-Sheet 1
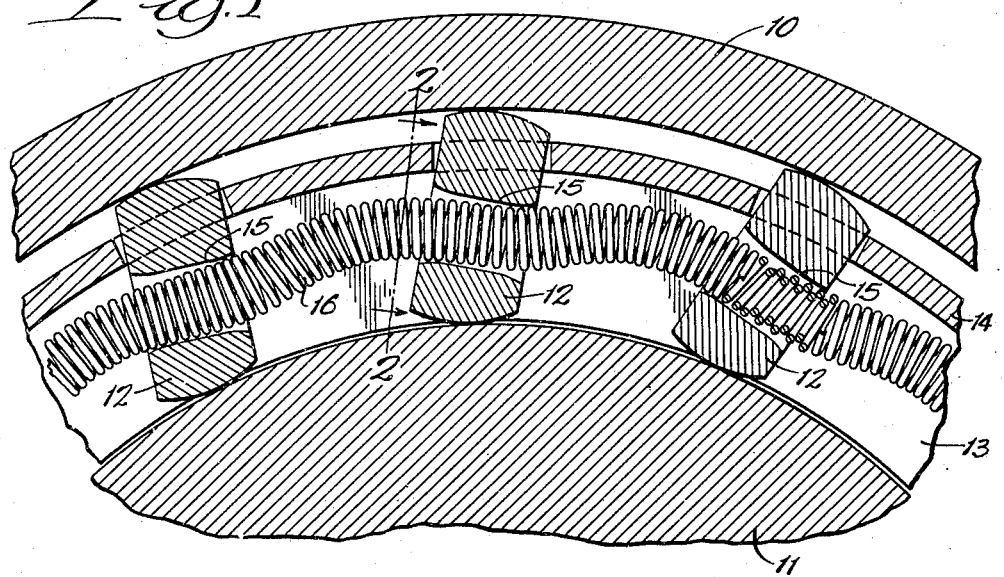
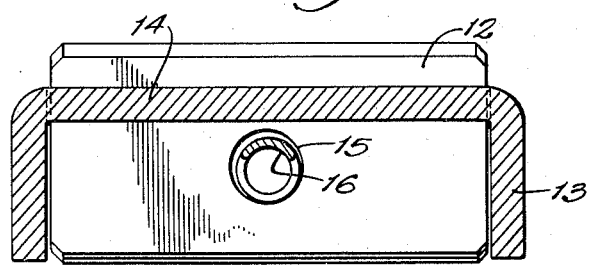
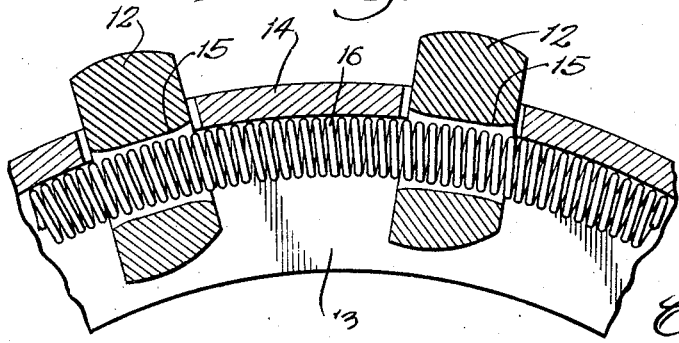
Inventor:
Carl E. Swenson,
By Dawson Ooms & Booth.
Attorneys.

Oct. 2, 1945.  C. E. SWENSON  2,386,013
ONE-WAY CLUTCH
Filed June 16, 1943  2 Sheets-Sheet 2

Inventor:
Carl E. Swenson,
By Dawson, Ooms and Booth,
Attorneys.

Patented Oct. 2, 1945

2,386,013

UNITED STATES PATENT OFFICE 2,386,013

ONE-WAY CLUTCH

Carl E. Swenson, Rockford, Ill.

Application June 16, 1943, Serial No. 490,969

11 Claims. (Cl. 192—45.1)

This invention relates to a one-way clutch and more particularly to the supporting and control of the tiltable gripper members in a clutch of this type.

One of the objects of the invention is to provide a one-way clutch in which the several grippers are uniformly urged to tilt toward engaged position.

Another object of the invention is to provide a one-way clutch in which the grippers are supported in a cage and are tilted by elongated springs fitting relatively closely into openings in the grippers and bent by the grippers so that they will exert a tilting force on the grippers. According to one desirable embodiment the spring may be an annular coil spring.

Still another object of the invention is to provide a one-way clutch in which an annular spring serves both to hold the grippers in a cage and to exert a uniform tilting force thereon.

The above and other objects and advantages of the invention will be more readily apparent from the following description when read in connection with the accompanying drawings, in which—

Figure 1 is a partial transverse section of a one-way clutch embodying the invention assembled between races;

Figure 2 is a section on the line 2—2 of Figure 1;

Figure 3 is a view similar to Figure 1 showing the clutch unit removed from the races;

Figure 4:
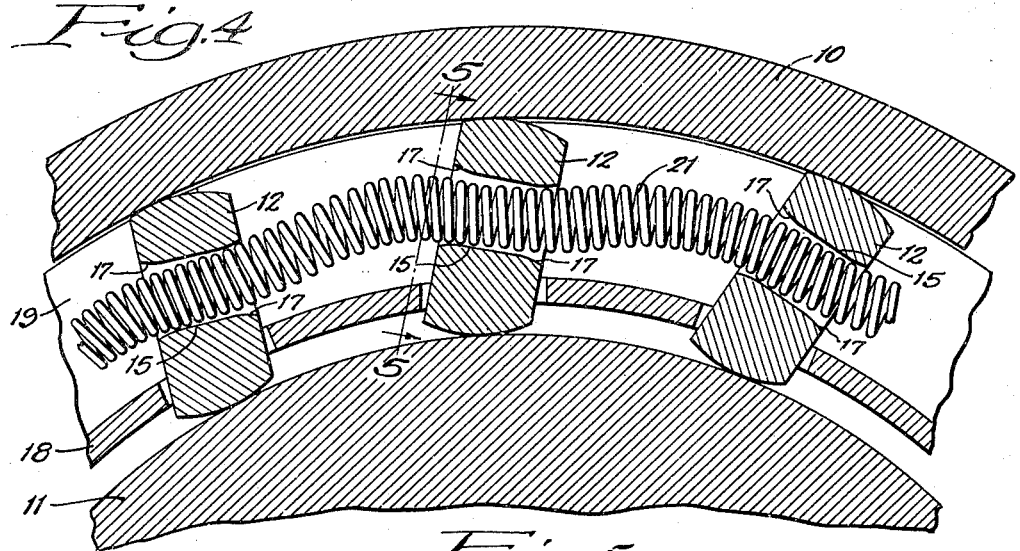
Figures 4 and 5 are views similar to Figures 1 and 2 of an alternative construction.

The clutch as shown is adapted to connect an outer race 10 to an inner coaxial race 11, the two races having facing cylindrical surfaces. A series of tiltable grippers 12 are mounted between the races and are adapted to be tilted counter-clockwise as shown to grip the races and clockwise to release them. The grippers are supported in an annular cage 13 having side members fitting against the ends of the grippers and cross members 14 lying between the grippers to hold them spaced and engageable with the grippers to limit tilting thereof.

In order to hold the grippers in the cage and to assist in tilting them each of the grippers 12 is formed with a central relatively large bore 15 to receive an annular coil spring 16. The spring 16 is of the garter spring type with its ends connected, preferably by having one end reduced and threaded into the other to form an annulus, and the coils of which are preferably spread slightly so that it will be under compression when assembled in the cage. The threaded connection between the ends of the spring is preferably arranged in the opening in one of the grippers so that it will not affect the flexibility of the spring between the grippers. Due to the fact that the spring is compressed it urges the grippers outwardly in the cage so that they are held assembled therein and the cage and grippers form a unit as shown in Figure 3.

When the unit is assembled between races the grippers must be tilted to assemble and thus the spring 26 is bent radially as shown in Figure 1 so that it exerts a tilting force on the grippers tending to move them into engaged position. When the cage is removed from the races the spring also serves to hold the grippers assembled in the cage. A spring of this type is advantageous since it has a low rate of loading and will stand substantial deformation without giving rise to high unit stresses so that a uniform force is provided acting on the several grippers. Furthermore, since the spring is relatively large in diameter, the size of the openings 15 is not as critical as with a smaller spring and manufacture and assembly of the unit may be accomplished easily and inexpensively.

Figure 6:
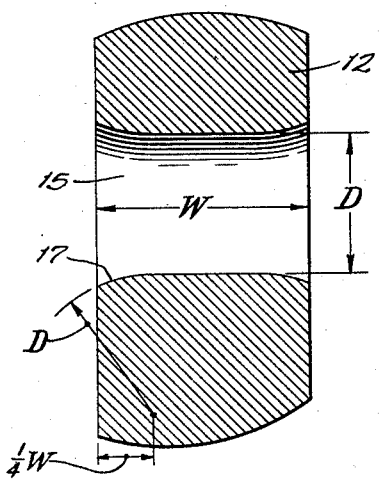
Figure 6 is an enlarged section of a gripper.

The grippers are constructed as more particularly illustrated in Figure 6 with arcuately curved portions 17 at the opposite ends of the openings 15. These portions are provided to shorten the effective length of the openings so that the spring will not be bent excessively and further so that the spring will not work over a sharp edge. As shown, the radius D of the curved portion 17 is equal to the diameter D of the opening 15 and the arcuate portion extends throughout substantially one-fourth of the width W of the gripper. It will be understood that these dimensions are approximate and that the length of the arcuate portion might in some instances be equal to one-third or more of the gripper width and that the radius of this portion might be made more or less than the diameter of the opening to satisfy different design conditions.

Figure 5:
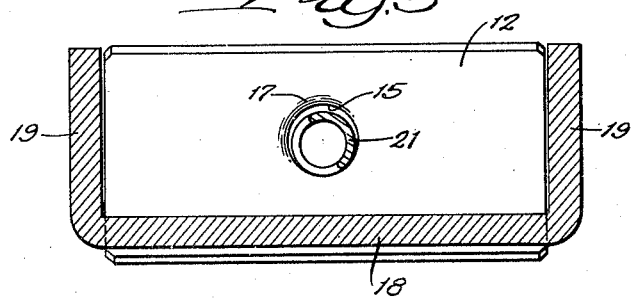

Figures 4 and 5 illustrate an alternative construction, parts therein identical with corresponding parts in Figures 1 and 2 being indicated by the same reference numerals. In this construction the grippers are held spaced by a cage having a web portion 18 formed with openings to receive the grippers and side flanges 19 which have a running fit on the outer race 10. The grippers are inserted between the outwardly extending flanges as shown and are held in place in the cage by a coil spring 21 passing through the openings in the grippers and which is normally of smaller diameter than the cage so that it will be under tension. The spring is bent laterally by the grippers when they are tilted the same as in the construction of Figure 1 to urge the grippers to tilt toward engaging position and this action is assisted by the tension in the spring acting against the grippers. When the cage and gripper assembly is removed from between the races the spring will contract to hold the grippers in the cage in an assembled unit.

While several embodiments of the invention have been shown and described in detail herein, it is to be understood that these are illustrative only and are not to be taken as a definition of the scope of the invention, reference being had for this purpose to the appended claims.

What is claimed is:

1. A one-way clutch for connecting inner and outer coaxial races comprising a series of tiltable grippers having transverse openings therethrough and interposed between the races, a cage supporting the grippers and having spaced cross members holding the grippers in spaced relationship, and an annular extensible and contractible spring extending through the openings and engaging the grippers adjacent the opposite ends of the openings to exert a tilting force on the grippers, the spring being biased lengthwise to tend to move toward the cross members whereby it will hold the grippers assembled in the cage.

2. A one-way clutch for connecting inner and outer coaxial races comprising a series of tiltable grippers having generally circumferentially extending openings therethrough and interposed between the races, and an annular coil spring extending through the openings, the openings being at such an angle that they will bend the spring transversely of its length so that it will exert a tilting force on the grippers.

3. A one-way clutch for connecting inner and outer coaxial races comprising a series of tiltable grippers having generally circumferentially extending openings therethrough and interposed between the races, a cage supporting the grippers and having cross members lying between adjacent grippers to hold them in spaced relation, and an annular coil spring extending through the openings to hold the grippers in the cage, the openings being of such a size and lying at such an angle that they will engage and bend the spring so that it will exert a tilting force on the grippers.

4. A one-way clutch for connecting inner and outer coaxial races comprising a series of tiltable grippers having generally circumferentially extending openings therethrough and interposed between the races, a cage supporting the grippers and having cross members lying between adjacent grippers to hold them in spaced relation, and an annular coil spring extending through the openings in the grippers and lying within the cage, the spring being compressed when assembled in the cage so that it exerts an outward force on the grippers.

5. A one-way clutch for connecting inner and outer coaxial races comprising a series of tiltable grippers having generally circumferentially extending openings therethrough and interposed between the races, a cage supporting the grippers and having cross members lying between adjacent grippers to hold them in spaced relation, and an annular coil spring extending through the openings in the grippers and lying within the cage, the spring being compressed when assembled in the cage and the openings lying at such an angle that the spring will be bent so that it exerts a tilting force on the grippers.

6. A one-way clutch for connecting inner and outer coaxial races comprising a series of tiltable grippers having generally circumferentially extending openings therethrough and interposed between the races, and a coil spring extending through the openings, one end of the spring being reduced and threaded into the other end to form a connection therebetween, and the connection lying within the opening in one of the grippers, the openings being of such a size and lying at such an angle that they will engage and bend the spring so that it will exert a tilting force on the grippers.

7. A one-way clutch for connecting inner and outer coaxial races comprising a series of tiltable grippers having generally circumferentially extending openings therethrough and interposed between the races, a cage supporting the grippers and having cross members lying between adjacent grippers to hold them in spaced relation, and an annular coil spring extending through the openings in the grippers and lying around the cross members of the cage, the spring being in tension so that it exerts an inward force on the grippers.

8. A one-way clutch for connecting inner and outer coaxial races comprising a series of tiltable grippers having generally circumferentially extending openings therethrough and interposed between the races, a cage supporting the grippers and having cross members lying between adjacent grippers to hold them in spaced relation, an annular coil spring extending through the openings in the grippers and lying outside of the cross members of the cage, the spring being in tension and the openings in the grippers lying at such an angle that the spring will be bent so that it exerts a tilting force on the grippers.

9. A one-way clutch for connecting inner and outer coaxial races comprising a series of tiltable grippers having transverse openings therethrough and interposed between the races, a cage supporting the grippers and having spaced cross members holding the grippers in spaced relationship, and an annular coil spring extended thru the openings and engaging the opposite ends of the openings so that it will be bent thereby and will exert a tilting force on the grippers, the spring biased lengthwise in such a way that it will tend to move toward the cross members so that it will hold the grippers assembled in the cage.

10. A one-way clutch comprising inner and outer coaxial races, a series of tiltable grippers interposed between the races and having openings therethrough extending generally circumferentially of the races, and an annular coil spring extending through the openings, the openings being at such an angle that when the grippers are disposed in contact with the races the spring is bent transversely of its length to thereby exert a tilting force on the grippers.

11. A one-way clutch comprising inner and outer coaxial races, a series of tiltable grippers interposed between the races and having openings therethrough extending generally circumferentially of the races, and an annular coil spring extending through the openings, and engaging the grippers adjacent the opposite ends of the openings, the thickness of the grippers at the openings being such as to enclose a plurality of loops of the coil spring between the points of contact, the openings being at such an angle that when the grippers are disposed in contact with the races the spring is bent transversely of its length to thereby exert a tilting force on the grippers.

CARL E. SWENSON.